Patented Jan. 16, 1923.

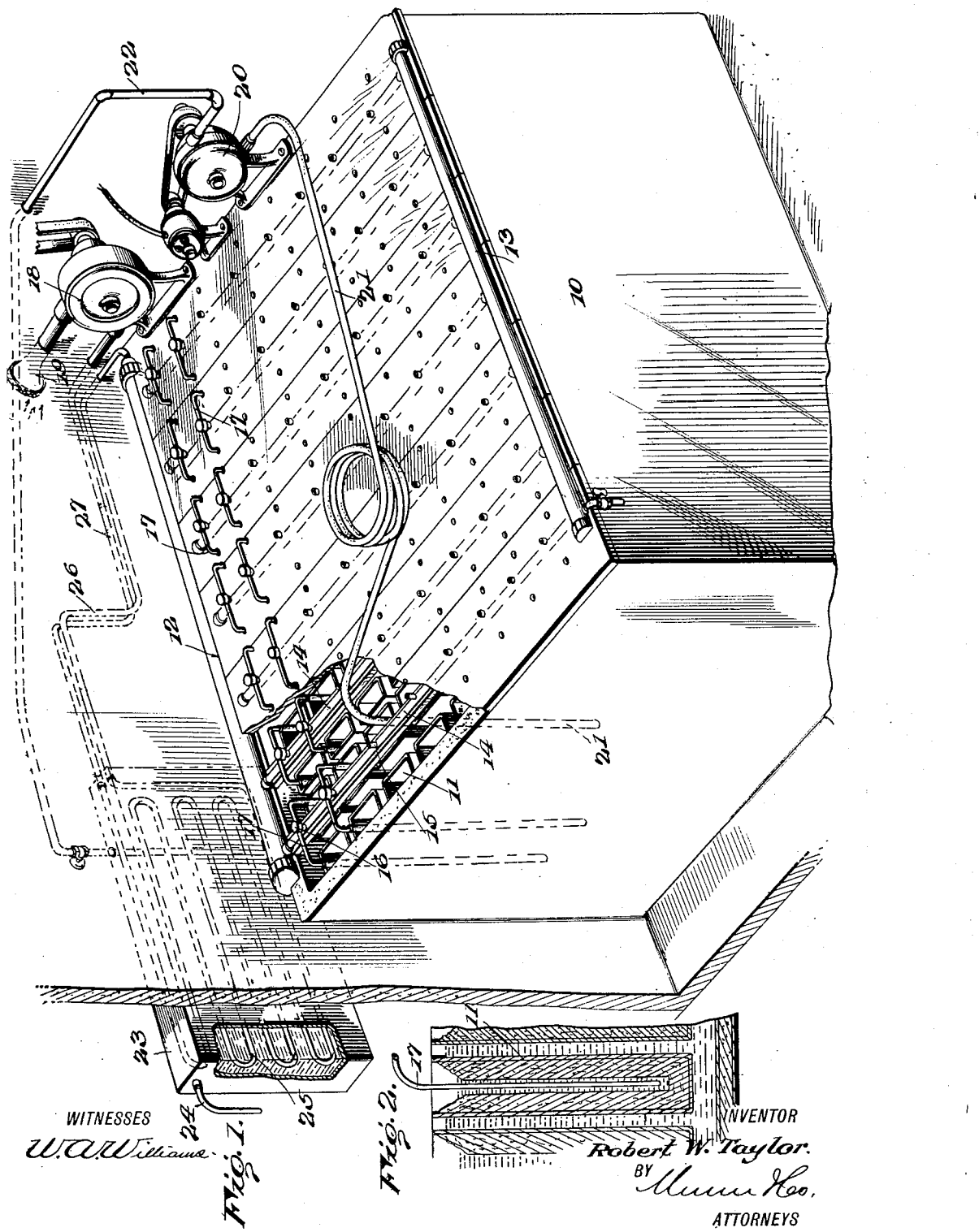

1,442,193

UNITED STATES PATENT OFFICE.

ROBERT W. TAYLOR, OF NEW ORLEANS, LOUISIANA.

ICE-MAKING APPARATUS.

Application filed April 15, 1922. Serial No. 552,838.

*To all whom it may concern:*

Be it known that I, ROBERT W. TAYLOR, a citizen of the United States, and a resident of New Orleans, in the State of Louisiana, have invented certain new and useful Improvements in Ice-Making Apparatus, of which the following is a specification.

My present invention relates generally to methods of and apparatus for freezing ice in blocks in cans, and more particularly to the present methods and apparatus wherein ordinary water is frozen in cans while in a stage of agitation owing to the introduction of air which thoroughly agitates the water and gradually brings the impurities to the center as the block is frozen into what is called the core of the block and from which the remaining water with the impurities is withdrawn at a certain stage in the freezing operation and replaced by distilled water, freezing of which completes the cake or block.

My improved method and apparatus has to do in particular with those at present used wherein atmospheric air is sucked in, usually by a suction fan and in turn expelled by this fan into the various freezing cans within a freezing tank by the use of air nozzles which can be readily withdrawn just prior to the removal of the core water. It is a well known fact that in such methods the core water is ordinarily withdrawn and discharged to waste and while necessary in the freezing of clear ice, the use of atmospheric air is detrimental to some extent on account of its relatively high temperature.

My invention proposes a method and apparatus in which these difficulties are overcome and decided advantages from a practical standpoint obtained by the use of the core water, ordinarily wasted for the purpose of cooling the indrawn air before it is delivered to the ice cans and is in this respect a departure from the usual methods and involves certain additions to known apparatus as I will now describe.

In the accompanying drawing which illustrates my present invention and forms a part of this specification, Figure 1 is a perspective view illustrating my improved apparatus, certain parts being broken away and in section, and Figure 2 is a vertical transverse section through a fragmentary portion of the tank and in particular through one of the cans therein.

Referring now to these figures, I have shown an ice tank at 10 in which rows of freezing cans 11 are disposed in parallel relation below an air distributing arrangement including headers 12 and 13 along opposite sides of the tank, connected by parallel supply pipes 14 extending lengthwise between the rows of cans 11. These supply pipes 14 have at equi-distantly spaced points upstanding nipples 15 to receive the connecting members 16 of inverted U-shaped nozzles 17, these nozzles depending into the cans 11 as particularly shown in Figure 2 so that when properly disposed in position air will be delivered from the lower ends thereof and will bubble upwardly through the water in the cans so as to maintain the same thoroughly agitated during the freezing operation and thus promote the collection of impurities within the central portion or core.

Air for this purpose is supplied to the header 12 and usually proceeds direct from a fan or blower 18 whose intake side is connected to an atmospheric air intake pipe 19 and it is obvious from this that the air being at a substantially greater temperature than the freezing water of the cans, will be detrimental to some extent as far as the freezing operation is concerned, even though its advantages are apparent and its supply could not well be omitted.

I have also shown in Figure 1 at 20 a pump which is started up at one stage of the freezing operation and whose intake side is connected to a flexible pipe 21 capable of extension downwardly into the cans for the purpose of withdrawing the core water when a block of ice is partly formed and freezing is proceeded to a point where but the core water with its impurities remains in liquid condition. Previous to introducing the suction pipe 21 for the purpose of withdrawing the core water, the nozzles 17 are removed and it is a well known fact at the present time that the core water being without use in so far as further freezing is concerned, is simply pumped out and discharged to waste.

In accordance with my invention however the outlet of the pump 20 is connected to a pipe 22, leading therefrom into a tank 23 and preferably discharging within this tank at a point adjacent to the base of the tank, the tank having an overflow pipe 24 adjacent to its upper end leading to any suitable point of discharge.

Within the tank 23 which thus constitutes a receiver of the core water, is a vertical coil 25, one end of which is connected to a pipe 26 leading to the outlet side of the fan or blower 18 and the other end of which is connected to a pipe 27 leading to the header 12 of the air supply connections of the freezing tank 10, it being noted that pipe 26 is connected to the upper end of the coil while pipe 27 leads from the lower end of the coil so that the air taken into the blower 18 at normal outside temperature, which temperature is slightly increased by the frictional blower passes through the coil 25 from the top to the bottom of the latter and finally leaves the coil at the coldest part of the tank or receiver 23.

It will thus be readily understood that by virtue of the fact that the core water withdrawn by the pump 20 from the various freezing cans 11 is intensely cold, although undesirable for freezing on account of the impurities suspended therein, this core water when delivered to the receiving tank 23, is adapted to lower the temperature of the air as the latter passes through the coil 25 and it is also to be plainly seen that in as much as this core water is discharged within tank 23 adjacent to the base of the latter, the air, proceeding through the coil 25, finally emerges from the tank 23 at the lower coldest portion of the latter, whereby its temperature is substantially lowered before it is fed into the ice cans through the nozzles.

By thus utilizing the ordinarily wasted core waters for the purpose of lowering the normal temperature of air to be introduced into the freezing cans, effects considerable advantage especially as regards economy in time, of the ice making processes and apparatus now used.

My invention for this purpose is not only simple, strong and durable, but is economical in upkeep as well as first cost, and involves but slight additions to the usual apparatus and may be installed in connection with new plants and apparatus and as readily applied and mounted in connection with ice freezing according to the method and apparatus above set forth.

I claim:

1. In ice making apparatus including means for delivering fluid agitating air within freezing cans and means for withdrawing the core water from such cans, of a tank forming a core water receiver, having an over flow pipe and having an inlet pipe opening into the lower portion thereof and connected to the core water withdrawing means, a vertical coil in the tank, and connecting pipes between said coil and said air delivery means whereby to pass air through the coil in its passage to the freezing cans.

2. In ice making apparatus, the combination with means for delivering agitating air into the fluid within freezing cans and means for withdrawing the core water from the cans, of means forming a receiver remote from the cans for the core water into which the last named means discharges, and means forming an air channel in the receiver, connected within the said air delivery means.

3. In ice making apparatus including a pump for withdrawing core water from ice freezing cans and a fan or blower for normally delivering air into said cans, a receiver into which the core water pump delivers, and a coil in said receiver connected at one end to the fan or blower, and connections leading to the freezing cans with which the other end of the coil is connected.

4. An apparatus of the character described including a freezing tank, freezing cans within the tank, air supply connections on the tank for said cans, including nozzles adapted to depend into the cans, a vertical coil having its lower end connected to the said air supply connections, a fan or blower having an atmospheric air intake and having its outlet connected to the upper end of the coil, a pump for withdrawing core water from the cans, having a flexible intake pipe, a tank forming a core water receiver, enclosing the said coil and having an inlet pipe opening into the lower portion of the said receiver and connected to the outlet of of the pump, said tank having an overflow pipe leading from its upper portion as described.

ROBT. W. TAYLOR,